United States Patent Office 3,487,067
Patented Dec. 30, 1969

---

3,487,067
DIRECT AZO DYES FOR CELLULOSE FIBERS
Anton Mudrak, Broadview Heights, and John A. Zelek, Shaker Heights, Ohio, assignors to Kewanee Oil Company, Bryn Mawr, Pa., a corporation of Delaware
No Drawing. Filed Feb. 2, 1967, Ser. No. 613,409
Int. Cl. C09b *33/18, 31/06;* D06p *3/82*
U.S. Cl. 260—173                                  5 Claims

ABSTRACT OF THE DISCLOSURE

Compounds adapted for direct dyeing of cotton-polyester blends having the formula

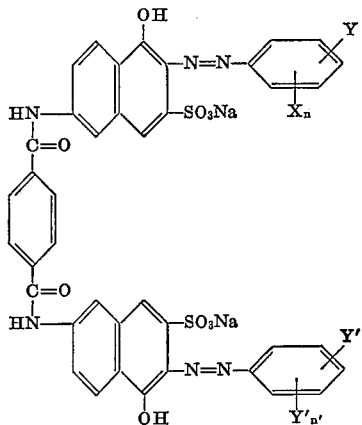

wherein
Y and Y' are radicals selected from the group consisting of

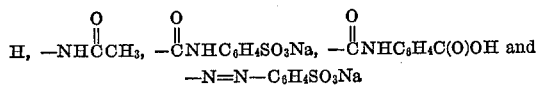

X and X' are radicals selected from the group consisting of H, alkyl of 1 to 10 carbon atoms, alkoxy of 1 to 6 carbon atoms, phenyl, naphthyl, benzyl, xylyl, tolyl, cyclohexyl, cyclopentyl, cyclohexoxy, cyclopentoxy, alkenyl of 2 to 6 carbon atoms, —SO₃Na, —COOH, CF₃, halogen, phenoxy, cyclohexenyl and N-N-dialkylsulfonamide having from 2 to 4 carbon atoms;
$n$ and $n'$ are 1 or 2.

DIRECT DYES FOR CELLULOSE FIBERS

This invention relates to new and novel dyes useful for coloring cotton and rayon fibers. More particularly, it relates to direct dyes improved for coloring cotton-polyester blends because of the dyes' improved resistance to thermal degradation.

It is well known that the best procedure for applying dyes to polyester involves temperatures of about 255° F. at which temperature very few dyes suitable for cotton retain their true color characteristics. Consequently, it has been necessary to dye cotton-polyester blends in two-step cycles. The first step is to apply the dyestuff onto the polyester at 255° F. and the second is to apply the direct dye onto the cotton at 210° F. The elimination of one of these steps would be an economical advantage.

It is an object of this invention to provide direct dyes that can be mixed and applied simultaneously with the polyester dyes at elevated temperatures, eliminating the necessity for the second step of the two-step cycle.

Coloring of cellulose materials, including cotton and rayon textile fibers and papers, as well as protein fibers, including silk and wool, and synthetic polyamides such as nylon may be done over a very wide range of shades and fastness to light, washing, dry cleaning, etc. by use of a wide class of organic compounds known as direct dyes.

There are a number of criteria for the performance characteristics of direct dyes, the most important of which are frequently lumped under one term "substantivity." The depth of shade which can be developed, the extent to which coloring matter is exhausted from the dye liquors during dyeing, the rate and uniformity with which the dye may be applied and its fastness to scouring with water and detergents are all part of its substantivity or affinity for cellulose. Other important properties, of course, are fastness to light, dry cleaning and rubbing and, more recently, resistance to thermal degradation and chemical attack by resin curing agents.

A wide variety of chemical and structural features of direct dye molecules have been cited in the literature as having a bearing on substantivity. The most important of these seems to be the presence of several sites of very high electron density, capable of participation in hydrogen bond formation, distributed uniformly throughout the molecule, and only enough solvation sites, also uniformly distributed, to render the dye only moderately soluble in water. Thus, the presence in a molecule of hydroxyl, amino, amido and azo gorups, which participate readily in hydrogen bonding, produces substantivity while the presence of sulfonic acid groups produces solubility.

Fastness to light, and resistance to thermal degradation and chemical attack are probably all closely related and dependent upon the structural stability of the molecule and the absence of easily oxidized, hydrolyzed or reduced linkages. Thus, the higher the degree of aromaticity and the greater and more uniform the conjugation, the more resistant will be the dye to actinic and thermal degradation, while the absence of aldehyde, nitro, halogen and olefin groupings in the molecule contributes to its resistance to chemical attack and, to some extent, to its resistance to actinic and thermal degradation as well.

The organic compounds of this invention provide a nearly perfect combination of structural and chemical features for use as fast, thermally stable direct dyes. These substances are characterized by a structural element which is stipulated to be largely responsible for their stability. This characteristic element is a symmetrical bis-terephthalamide about which various azo groupings are arranged.

While the compounds of this invention are generally shown in the sodium salt form, since this is the form in which the product is generally found, it is intended that the acid form is likewise contemplated.

The compounds of this invention are represented by the formula

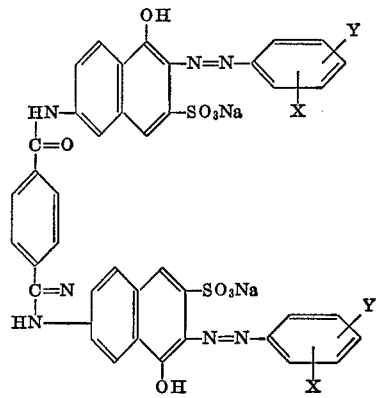

wherein each Y represents identical or different radicals selected from the class of hydrogen, —NHC(O)CH₃, —C(O)NHC₆H₄SO₃Na, —CONHC₆H₄COOH, —COOH and —N=NC₆H₄SO₃Na. In these compounds the Y is preferably in the para position as shown but somewhat similar properties are shown when Y is in another position. Moreover, in these Y groups the —SO₃Na or —COOH is preferably in the para position although similar results are obtained when this group is in the meta or ortho position.

Moreover the phenylene radical to which Y is attached and the various phenylene radicals shown in some of the groups represented by Y, can have one or two other derivative groups, represented as X, without detracting from the desirable properties of these new compounds. For example, these phenylene nuclei can also be substituted with one or two X groups selected from the class of alkyl, alkenyl, aryl, cycloalkyl, alkoxy, aryloxy, cycloalkoxy, cycloalkenyl, Na sulfonate, carboxylic acid, Na carboxylate, trifluoromethyl, N,N - dialkylsulfonamide, such as N,N-diethylsulfonamide, etc., and halogen atoms, namely chlorine, bromine, fluorine, and iodine. Preferably these phenylene radicals are unsubstituted except for the groups indicated in the formula and when substituent groups are present there is preferably only one such group and preferably there are no more than ten carbon atoms in such substituent groups.

Typical of the specific derivative groups represented by the above are: methyl, ethyl, propyl, amyl, hexyl, decyl, vinyl, allyl, pentenyl, hexenyl, phenyl, tolyl, xylyl, naphthyl, benzyl, phenethyl, cyclohexy, cyclopentyl, cyclohexenyl, methylcyclohexenyl, methoxy, propoxy, amyloxy, phenoxy, naphthoxy, tolyloxy, beta-phenylethoxy, cyclohexyloxy, cyclopentyloxy, etc.

This invention will be more fully described by the following examples which are given merely by way of illustration. They are not intended to limt or restrict the scope of the invention, nor the manner in which it may be practiced. In these examples and throughout the specification, unless specifically provided otherwise, parts and percentages are given by weight.

EXAMPLE I

Preparation of terephthaloyl-J-acid (6,6'-terephthaloylamino-bis (1-naphthol-3-sulfonic acid))

To 800 ml. of water add 119.5 g. J-acid with stirring. Enough sodium carbonate is added to make the solution alkaline to brilliant yellow. The resultant solution is heated to 70–75° C. and 50.7 g. terephthaloyl chloride is added gradually over a 40 minute period while adding sodium carbonate to keep for solution alkaline to brilliant yellow. This solution is stirred for 2½ hours at 70–75° C.

The product, terephthaloyl-J-acid, has the formula

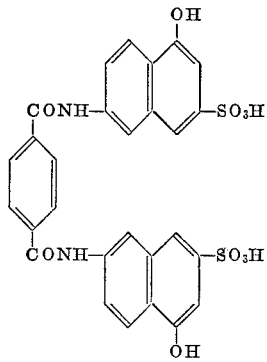

I

This product is filtered while hot and washed with a small amount of 10% salt solution. To remove unreacted amine, it is slurried in one liter of water and sufficient sodium carbonate added to raise the pH to 9, then it is heated to 85° C. and 175 g. of sodium chloride added. This is cooled to 75° C., filtered and the filter cake washed with 10% salt solution.

FIRST DIAZOTIZATION

To 400 ml. of water there is added g. of 4-aminoazobenzene-4'-sulfonic acid with stirring. Then 20% sodium carbonate is added to give a pH of 9–9.5, following which the solution is warmed to 50° C. When complete solution is attained 1.4 grams sodium nitrite in water is added and the solution cooled to 30° C. To this are added 11 g. hydrochloric acid (28.5%) and 200 g. of ice with vigorous stirring. This is stirred for 4 hours at 0–5° C. and then the insoluble diazonium salt is filtered, washed with cold water and suspended in cold water.

To 300 ml. of water and 35 ml. of 20% sodium carbonate is added 13 g. of terephthaloyl-J-acid (I) and dissolved by heating to 75–80° C. The pH is adjusted to 6.5 with acetic acid after which the solution is cooled with ice to 15° C.

FIRST COUPLING

The slurry of the diazonium salt is added to the terephthaloyl-J-acid solution with stirring over a period of 10 minutes and stirring then continued for 5 hours without temperature control.

SECOND DIAZOTIZATION

To 35 ml. of water and with stirring, there are added 5.1 ml. of 31.5% hydrochloric acid and 3.0 g. p-aminoacetanilide. This is cooled with ice to 0–5° C. and 1.4 g. sodium nitrite dissolved in water is added. The solution is stirred for ½ hour at 0.5° C.

SECOND COUPLING

After the first coupling is completed, the pH is adjusted to 9 with sodium carbonate. The solution is cooled to 10° C. and the diazotized p-aminoacetanilide added during 5 minutes. This is stirred for 10 hours at room temperature. Heat to 90° C., add salt until precipitation starts and cool to room temperature. If the precipitate is gelatinous add sufficient isopropyl alcohol to get a filterable product and filter. Wash clean with isopropyl alcohol. Dry at 50–60° C. If the product contains much salt, it may be removed by slurrying with water and filtering.

The product, represented by the following formula,

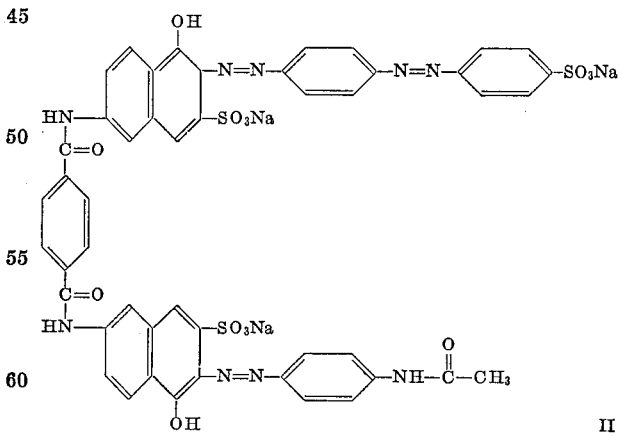

II is a red direct dye.

EXAMPLE II

FIRST DIAZOTIZATION

To 55 ml. of water add 11.1 g. hydrochloric acid (31.5%). Stir and add 6.0 g. of p-aminoacetanilide and after solution is complete add 55 g. of ice and 2.9 g. sodium nitrite in water. Stir for ½ hour at 0–5° C.

Terephthaloyl-J-acid solution

To 330 ml. of water and 8.9 g. of 40% sodium hydroxide there is added 24.3 g. of terephthaloyl-J-acid (Compound I, Ex. I) as a paste and stirred until dissolved.

To this 55 g. of ice and 55 ml. of 20% sodium acetate are added.

FIRST COUPLING

The diazonium solution prepared by the first diazotization is added to the terephthaloyl-J-acid solution, the pH is adjusted to 7.5–8.0, and stirring continued overnight without temperature control.

SECOND DIAZOTIZATION

To 55 ml. of water, there is added 11.1 g. of hydrochloric acid (31.5%), and then 3.7 g. aniline with stirring. The product is cooled with ice to 0.5° C. and then 2.8 g. sodium nitrite dissolved in water is added. This is stirred for 15 minutes at 0.5° C.

SECOND COUPLING

When the first coupling is complete, the diazotized aniline solution is added rapidly, the pH adjusted to 8–9, and the solution stirred overnight at room temperature. Then it is warmed to 75° C., 3% salt added, and then filtered. If the precipitate is gelatinous, sufficient isopropyl alcohol is added to give a filterable product. After filtering, the filter cake is washed clean with isopropyl alcohol and dried at 50–60° C.

This product is represented by the formula:

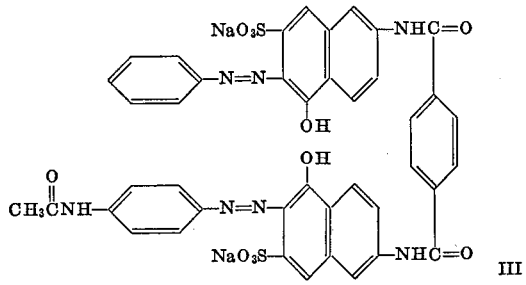

III

EXAMPLE III

DIAZOTIZATION

To 40 ml. of water, 10 ml. hydrochloric acid (31.5%) is added. Then 3.2 g. of aniline and 30 g. ice to bring temperature to 0–5° C. are added. A solution of 2.4 g. sodium nitrite dissolved in water is added and the product stirred for 15 minutes.

Terephthaloyl-J-acid solution

To 120 ml. of water, 3.75 g. of 40% sodium hydroxide is added. With stirring there are added 6.0 g. of sodium carbonate and then 10.9 g. of terephthaloyl-J-acid (Compound I, Example I) as a 25–30% paste. The product is cooled with ice to 10–15° C.

COUPLING

The diazonium solution is added to the stirred terephthaloyl-J-acid solution above over a period of 30–40 minutes at 10–15° C., after which stirring is continued for an hour. Add enough salt to bring up to 4% salt solution and continue stirring to effect complete precipitation. Filter, wash with 4% salt solution and dry at 50–60° C.

The product, represented by the formula

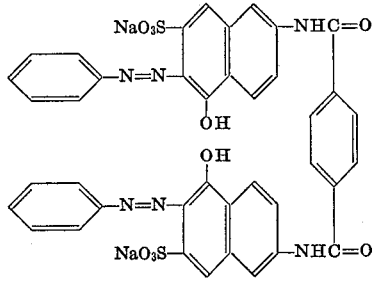

is an orange red direct dye.

EXAMPLE V

Preparation of 4-aminobenzanilide-4'-sulfonic acid

To 500 ml. of water there is added with stirring, 86.5 g. of sulfanilic acid and the pH adjusted to 8–9 by the addition of 30 g. of sodium carbonate. The solution is heated to 75° C. and over a period of 30–40 minutes, 92.8 g. of p-nitrobenzoyl chloride and enough sodium carbonate to maintain a pH of 8–9 are added. A test is made for diazotizable amine, and if any is present the addition of p-nitrobenzoyl chloride and sodium carbonate are continued until the amine test is negative. The pH is adjusted to 6, and then the product is filtered and washed with water.

REDUCTION

To 1000 ml. of water there are added with stirring, 175 g. of iron powder and 11 ml. of glacial acetic acid. The solution is boiled for a few minutes and then the nitro compound is added at 90–96° C. over a period of 40 minutes. This is stirred at 98–100° C. for 6 hours, then diluted to 4.5 liters and sodium carbonate added to adjust the pH to 9. The product is heated to 85–90° C., filtered through Super-Cel, and then hydrochloric acid added to adjust the pH to 6. This is cooled to 10–15° C. with stirring. The product is filtered and dried at 40° C.

DIAZOTIZATION

To 50 ml. of concentrated sulfuric acid, cooled to 10–15° C., there is added 11.7 g. of the 4-aminobenzanilide-4'-sulfonic acid prepared above. This is cooled to 10° C. and 9.4 g. 53% nitrosyl sulfuric acid added. The temperature is allowed to rise to 50° C. over a period of 3 hours. The resultant mixture is poured onto 500 ml. of water and ice. The insoluble diazonium compound is filtered and washed with water. The diazonium compound is suspended in cold water and the pH adjusted to 5–6 with sodium bicarbonate.

Terephthaloyl-J-acid solution

To 700 ml. of water there is added 1.6 g. of sodium hydroxide. This is stirred until dissolved and then 13 g. of terephthaloyl-J-acid (100% basis) is added. This is dissolved at 80° C., cooled and the solution clarified by filtration. The filtrate is cooled with ice to 0–2° C.

COUPLING

The terephthaloyl-J-acid solution is added with vigorous agitation to the water suspension of the diazonium compound over a 15 minute period at 15–18° C. The pH is adjusted to 7.5 with sodium carbonate and stirred for 4 hours at room temperature. This is clarified through Super-Cel if necessary. The sodium is heated to 70° C. and enough salt is added to make a 10% salt solution. The pH adjusted to 7. The product is cooled to room temperature. If a gel forms which cannot be filtered, sufficient isopropyl alcohol is added to give a filterable product. The filter cake is washed with aqueous isopropyl alcohol and dried at 50–70° C. The orange product is represented by the formula

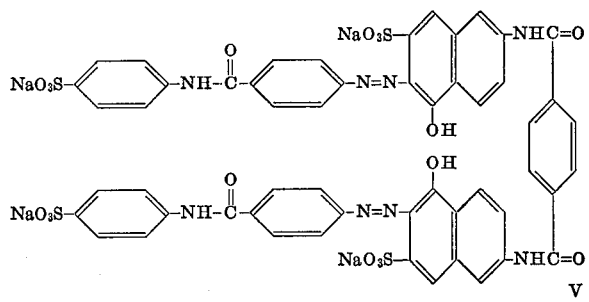

V

EXAMPLE V

The procedure of Example IV is repeated using, instead of the sulfanilic acid, an equivalent amount of paraaminobenzoic acid. The ultimate product is similar in structure and properties to Compound V above except that the terminal —SO₃Na radicals are replaced by carboxylic radicals.

EXAMPLE VI

The procedures of Examples I–IV are repeated a number of times using corresponding reagents in which the phenylene group to which Y is attached in the generic formula has as an X group methyl, amyl, decyl, phenyl, ethoxy, hexoxy, phenoxy, cyclohexyl, cyclohexoxy, allyl, benzyl, —SO₃Na, —COOH, Cl, CF₃ and —SO₃N(CH₃)₂ respectively. In each case corresponding products are obtained having the desirable properties described above for direct dyeing.

EXAMPLE VII

The precedure of Example I is repeated a number of times using in place of the 4-aminoazobenzene-4′-sulfonic acid an equivalent amount of derivatives thereof having in the 2′ position methyl, ethoxy, phenyl, allyl, benzyl and CF₃ respectively. In each case similar results are obtained.

EXAMPLE VIII

The procedure of Example II is repeated a number of times using in place of the aniline equivalent amount of derivatives thereof having in the para position methyl, benzyl, butoxy, butenyl, bromine and SO₃Na. In each case similar results are obtained.

When the procedures of Examples I–IV are repeated using other reagents having the various substituent groups indicated above as being present in the phenylene radicals of the Y group and in the phenylene nucleus to which the Y groups are attached in the generic formula the various other compounds of this invention are prepared. In each case these compounds have the stability and other properties desirable for use as direct dyes as described above.

When tested in accordane with procedures for use of direct dyes, the compounds of this invention, particularly those shown in the above examples, show excellent dyeing properties.

The invention claimed is:

1. Compounds adapted for direct dyeing of cotton-polyester blends having the formula

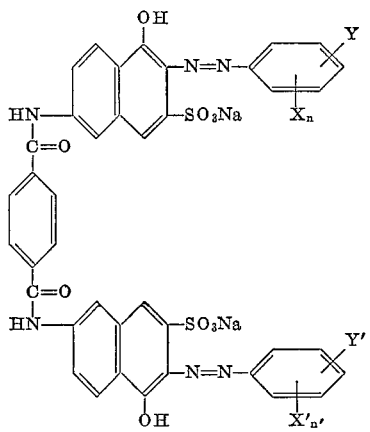

wherein

Y and Y′ are radicals selected from the group consisting of

H, —NHĊCH₃, —ĊNHC₆H₄SO₃Na, —ĊNHC₆H₄C(O)OC
and

—N=N—C₆H₄SO₃Na

X and X′ are radicals selected from the group consisting of H, alkyl of 1 to 10 carbon atoms, alkoxy of 1 to 6 carbon atoms, phenyl, naphthyl, benzyl, xylyl, tolyl, cyclohexyl, cyclopentyl, cyclohexoxy, cyclopentoxy, alkenyl of 2 to 6 carbon atoms, —SO₃Na,
—COOH, CF₃, halogen, phenoxy, cyclohexenyl and N-N-dialkylsulfonamide having from 2 to 4 carbon atoms; and n and n′ are 1 or 2.

2. A compound of claim 1 having the formula

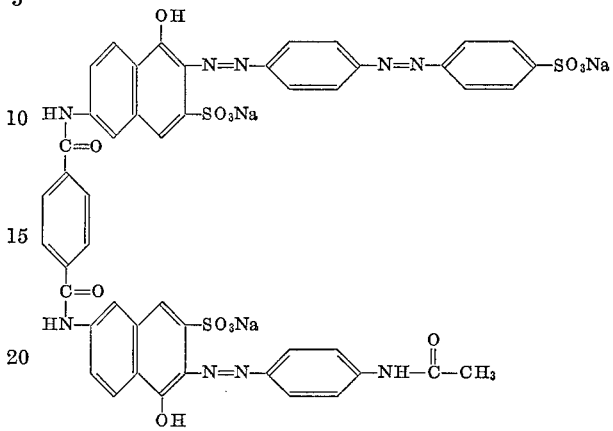

3. A compound of claim 1 having the formula

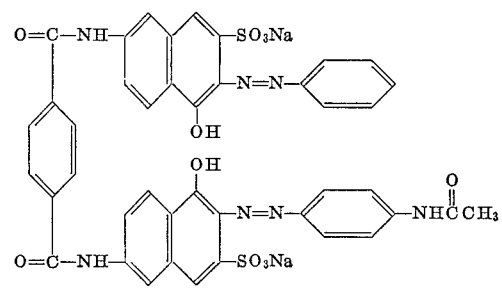

4. A compound of claim 1 having the formula

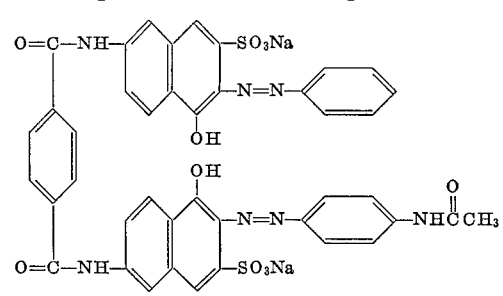

5. A compound of claim 1 having the formula

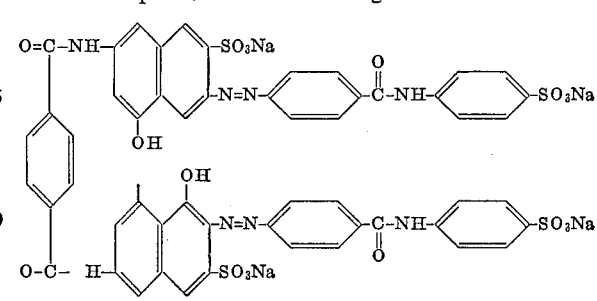

References Cited

UNITED STATES PATENTS 3,262,925    7/1966    Muller et al. _____ 260—174

CHARLES B. PARKER, Primary Examiner

D. M. PAPUGA, Assistant Examiner

U.S. Cl. X.R.

260—174, 166; 8—41, 55

UNITED STATES PATENT OFFICE
CERTIFICATE OF CORRECTION

Patent No. 3,487,067                      December 30, 1969

Anton Mudrak et al.

It is certified that error appears in the above identified patent and that said Letters Patent are hereby corrected as shown below:

Column 1, line 31, "$Y'_n{'}$" should read -- $X'_n{'}$ --. Column line 31, "cyclohexy" should read -- cyclohexyl --; line 37, "limt should read -- limit --; line 51, "for" should read -- the --. Column 6, line 1, "Example V" should read -- Example IV --; line 2, "4-aminooenzanilide" should read -- 4-aminobenzanilide --. Column 7, line 67, end of line, "OC" should read -- OH --. Column 8, line 57, "OH" should be under second ring not the first one; line 62, "O-C-H" at beginning of line should read -- O-C-NH --.

Signed and sealed this 10th day of November 1970.

(SEAL)
Attest:

Edward M. Fletcher, Jr.                    WILLIAM E. SCHUYLER, JR.
Attesting Officer                               Commissioner of Patents